United States Patent [19]
Reed et al.

[11] Patent Number: 5,913,766
[45] Date of Patent: Jun. 22, 1999

[54] APPARATUS AND METHOD FOR CRUSHING A HONEY COMB PANEL

[75] Inventors: Robert R. Reed, Hiram; Paul G. Hegger, Marietta, both of Ga.; Paul Moser, Milford, Conn.; Jeffrey L. Karr, Douglasville, Ga.

[73] Assignee: Tenneco Packaging, Lake Forest, Ill.

[21] Appl. No.: 08/715,575

[22] Filed: Sep. 18, 1996

Related U.S. Application Data

[62] Continuation-in-part of application No. 08/677,020, Jul. 8, 1996, abandoned, application No. 08/553,582, and application No. 08/497,947, Jul. 3, 1995, Pat. No. 5,678,968, said application No. 08/677,020, is a division of application No. 08/467,932, Jun. 6, 1995, Pat. No. 5,533,956, which is a continuation of application No. 08/253,428, Jun. 2, 1994, abandoned, which is a continuation of application No. 07/840,768, Feb. 24, 1992, abandoned, said application No. 08/553,582, filed as application No. PCT/US94/05950, May 26, 1994, is a continuation-in-part of application No. 08/070,097, May 28, 1993, Pat. No. 5,540,972.

[51] Int. Cl.$^6$ .............................. B31D 3/02; B31F 1/00
[52] U.S. Cl. ........................ 493/464; 493/352; 493/354
[58] Field of Search ........................ 493/464, 331, 493/334, 335, 344, 345, 347, 354, 355, 382, 394, 396, 399, 402, 403; 83/862–865, 880, 886, 128; 428/116; 100/176, 42, 159, 160, 161, 168, 169

[56] References Cited

U.S. PATENT DOCUMENTS

| | | | |
|---|---|---|---|
| Re. 11,769 | 9/1899 | Mallett | 100/161 |
| 2,720,948 | 10/1955 | Pajak | 189/34 |
| 2,728,479 | 12/1955 | Wheeler | 217/35 |
| 2,933,122 | 4/1960 | Christman | 153/2 |
| 3,255,949 | 6/1966 | Buttery | 229/51 |
| 3,314,339 | 4/1967 | Guffy et al. | 93/58.1 |
| 3,481,813 | 12/1969 | Wiggers | 156/211 |
| 3,746,593 | 7/1973 | Majewski et al. | 156/207 |
| 3,890,108 | 6/1975 | Welsh | 29/191.4 |
| 3,910,485 | 10/1975 | Wandel | 229/37 R |
| 4,194,313 | 3/1980 | Downing | 40/610 |
| 4,467,497 | 8/1984 | Peterson | 100/176 |
| 4,596,541 | 6/1986 | Ward | 493/59 |
| 4,883,179 | 11/1989 | Dionne | 206/523 |
| 5,169,651 | 12/1992 | Heiber | 493/403 |
| 5,175,696 | 12/1992 | Webb | 428/116 |
| 5,466,211 | 11/1995 | Komarek | 493/355 |
| 5,511,667 | 4/1996 | Carder | 206/586 |
| 5,533,956 | 7/1996 | Komarek | 493/355 |

FOREIGN PATENT DOCUMENTS 2277709  4/1993  United Kingdom .

*Primary Examiner*—Jack W. Lavinder
*Attorney, Agent, or Firm*—Arnold White & Durkee

[57] ABSTRACT

An apparatus and method are disclosed for crushing panels including a conveyor for moving the panel with respect to a compression assembly including a plurality of crushing elements which may be positioned at different heights with respect to the conveyor for incrementally crushing at least a portion of the panel.

48 Claims, 7 Drawing Sheets

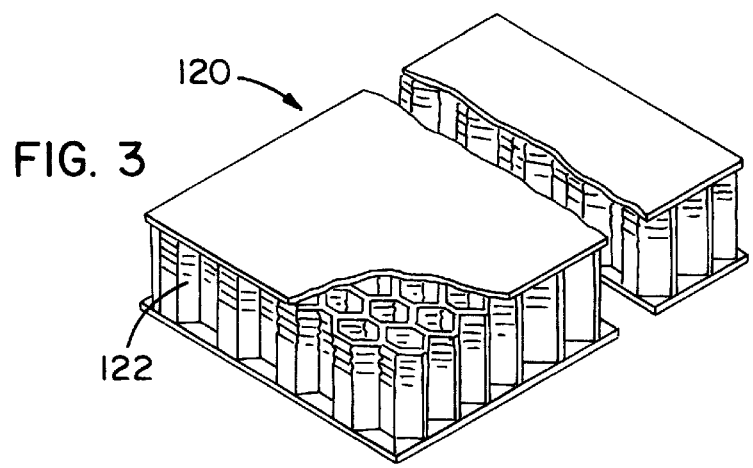
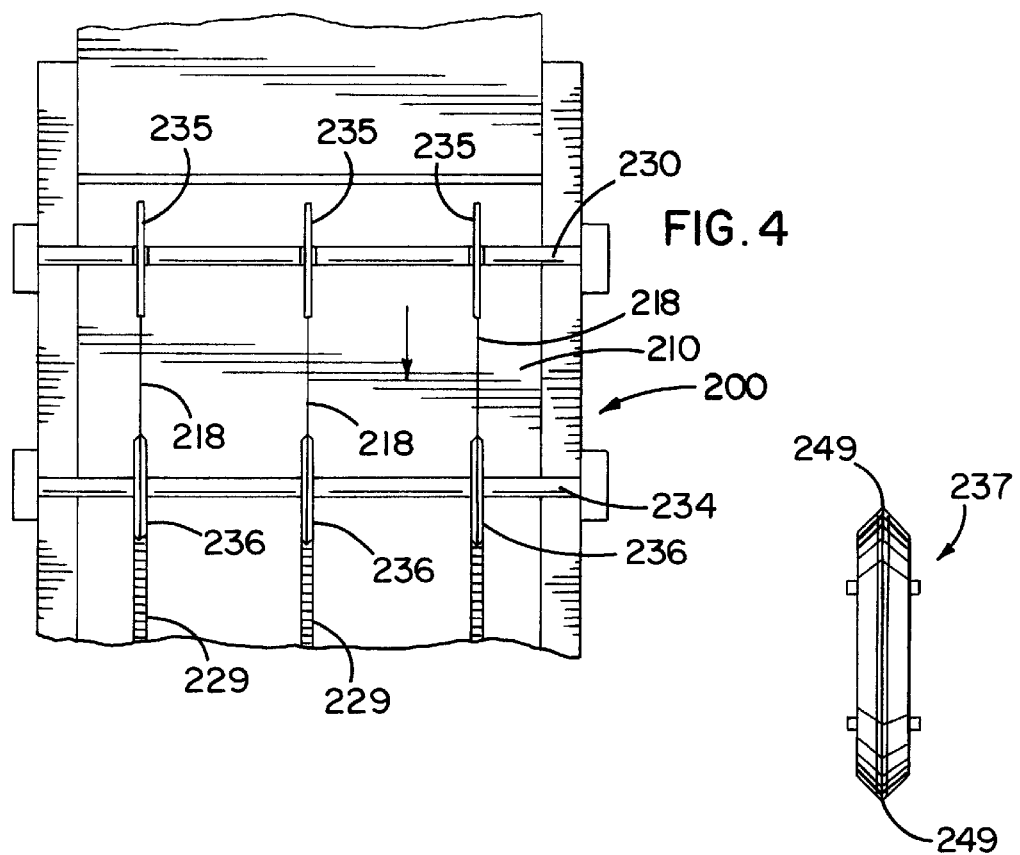
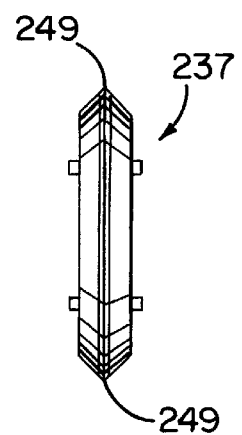
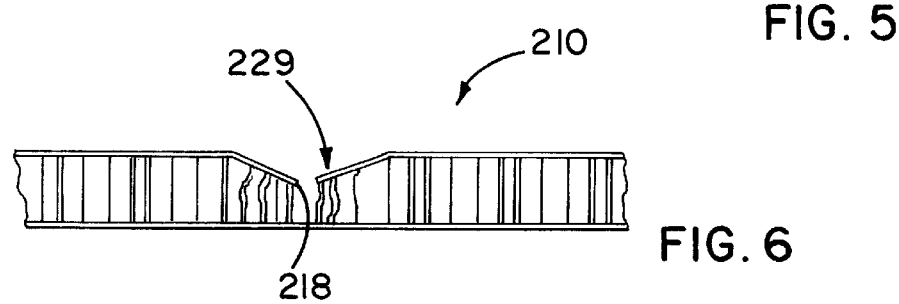

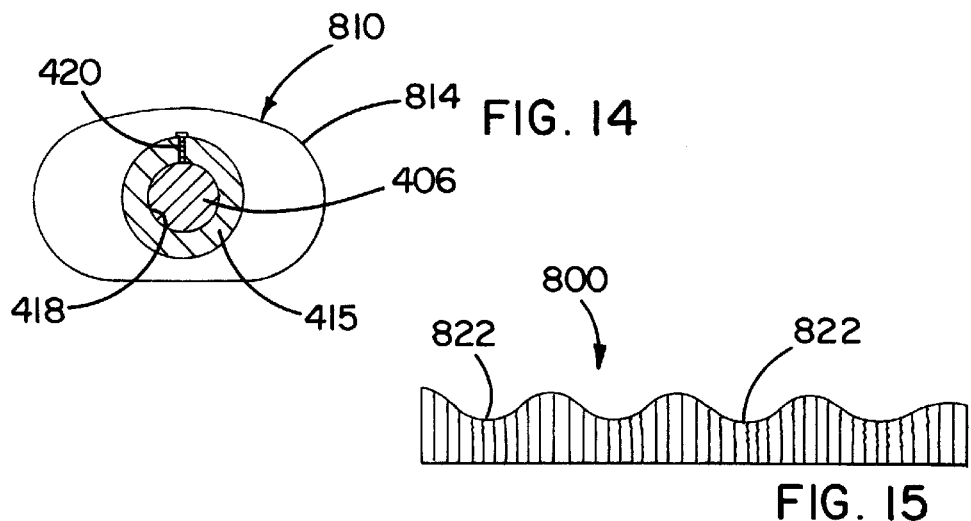
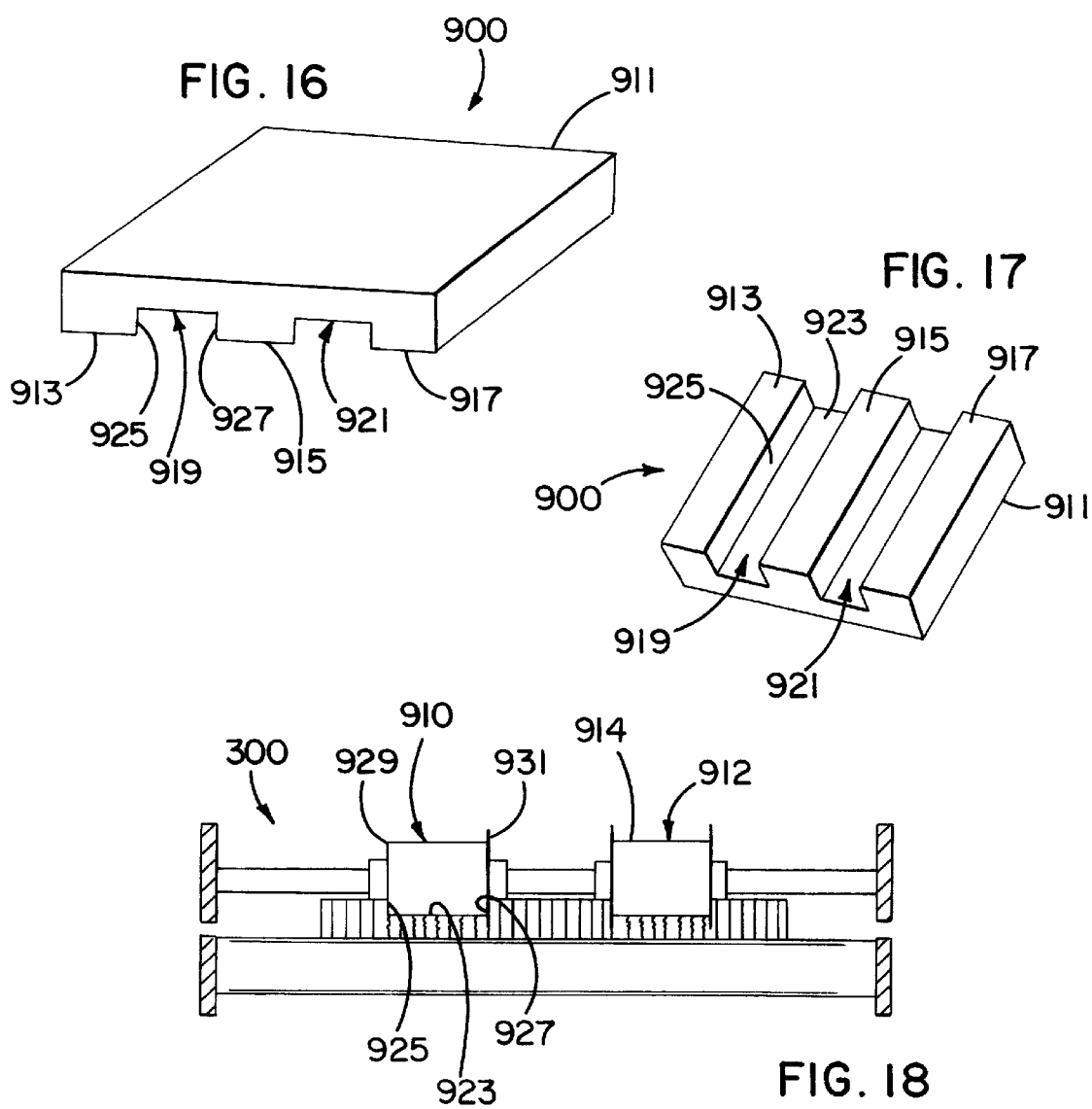

APPARATUS AND METHOD FOR CRUSHING A HONEY COMB PANEL

RELATED APPLICATIONS

This application is a continuation-in-part application of the following pending applications: application Ser. No. 08/677,020 filed on Jul. 8, 1996 now abandoned which is a division of application Ser. No. 08/467,932 filed on Jun. 6, 1995 and issued on Jul. 9, 1996 as U.S. Pat. No. 5,533,956, which was a file wrapper continuation of application Ser. No. 08/253,428 filed on Jun. 2, 1994 now abandoned, which was a file wrapper continuation of application Ser. No. 07/840,768 filed on Feb. 24, 1992 also now abandoned; application Ser. No. 08/553,582 filed on Nov. 14, 1995 still pending which claims the priority of PCT application Serial No. US94/05950 filed on May 26, 1994 and published on Dec. 8, 1994 as International Publication No. WO 94/27814 which was a continuation-in-part of application Ser. No. 08/070,097 filed on May 28, 1993 and issued on Jul. 30, 1996 as U.S. Pat. No. 5,540,972; and application Ser. No. 08/497,947 filed on Jul. 3, 1995, now U.S. Pat. No. 5,678,968 all incorporated by reference.

TECHNICAL FIELD OF THE INVENTION

This invention relates to an apparatus and method for crushing a honeycomb panel and, more particularly, to an apparatus and method for crushing at least a portion of the honeycomb panel.

BACKGROUND OF THE INVENTION

Many of the packaging and shipment containers, cartons, and products that are in use today are made of panels which have been crushed and recessed to cushion and receive articles for storage and shipment. One such product is the honeycomb carton disclosed in U.S. Pat. No. 5,540,972 to Jaegers et al. entitled "Prestressed Honeycomb, Method And Apparatus Therefor" which includes crushed honeycomb panels for cushioning the articles. The panels that form the carton were previously made in a vertical press.

Another such product is the roll spacer disclosed in U.S. patent application Ser. No. 08/497,947 to Bourgeois et al. filed on Jul. 3, 1995 entitled "Honeycomb Roll Spacer". The roll spacer is made of a panel including a honeycomb core sandwiched between opposite face sheets. A portion of the panel includes a longitudinal recess in which a portion of the honeycomb core and one of the face sheets has been compressively deformed and crushed to a predetermined depth. The recess is generally concavely shaped to receive and cushion a roll of web material such as paper, steel, coppers etc in either a horizontal or vertical orientation for transport by truck, rail, or the like.

The spacer described above was previously manufactured using a vertical press with a longitudinally extending semi-elliptically shaped cushioning element which is pressed into the honeycomb panel to form the recess.

Other products made of honeycomb panels such as pallets include a center portion which is crushed and recessed to allow the forks of a forklift to slide under the pallet. The pallet was also made using a vertical press.

A disadvantage associated with the use of such vertical presses is the risk of abrasion, piercing and cutting of the face sheet of the panel as a result of the crushing element being brought down in a single step into contact with the honeycomb panel Another disadvantage is the risk of uneven deformation and damage to the partition walls of the honeycomb core as a result of the honeycomb core being compressed to a predetermined depth in one step. Yet another disadvantage is that the use of a press is a labor-intensive, time-consuming, inefficient manufacturing process particularly where large quantities of products are required to be made.

What is needed is a continuous in-line apparatus for crushing honeycomb panels in which neither the face sheets or the honeycomb core are damaged during the compression of the honeycomb panel. What is also needed is an in-line apparatus which provides for the efficient and economical production of large quantities of roll spacers, pallets and other honeycomb products comprising crushed or recessed honeycomb panels. The in-line apparatus of the present invention meets these desires.

SUMMARY OF THE INVENTION

The present invention is an apparatus and method for at least partially crushing a honeycomb panel. The panel can be crushed across its entire face to provide a cushion or only part of the panel is crushed such as is done to produce a roll spacer or pallet. The apparatus uses a crushing element for compressively crushing at least a portion of the panel and a conveyor for moving the panel and the crushing element with respect to each other. The crushing element compresses the portion of the panel as the panel and the crushing element are moved with respect to each other.

In one embodiment, the crushing element is a compression roller above the panel which extends the width of the panel for crushing the entire panel. In another embodiment, the compression roller is sized to form a recess in the panel. The compression roller may have any desired shape or configuration including elliptically shaped for making a generally concavely shaped recess in the panel, cylindrically shaped for making a generally rectangularly shaped recess in the panel, and wedge shaped such as for making an angle crush slit recess in the panel.

The apparatus can also include a slitting element for cutting the panel either prior to or simultaneously with the crushing of the panel. In one embodiment, the slitting element precedes the crushing element and slits the portion of the panel to be crushed. In another embodiment, the slitting element is a knife edge extending circumferentially around the outer surface of the compression roller for simultaneously cutting and crushing the panel. In a further embodiment, the slitting element comprises circular knives mounted to the shaft and positioned at opposite ends of the compression roller for forming the sides of the recess which is formed in the panel.

Depending on the shape of the crushing element or the design of the finished panel, it can be advantageous to first slit at least one face sheet of the panel. This helps to avoid tearing of the face sheet of the panel and allows for a more controlled crush. It is also useful where a cylindrical compression roller is used to create a rectangular recess in the panel as is useful for making pallets.

In the preferred embodiments, the apparatus uses a plurality of compression rollers positioned above the panel in spaced apart relation from each other in the direction in which the honeycomb panel is moved through the apparatus. Each of the compression rollers are positioned at an incrementally different height with respect to the conveyor for incrementally compressively crushing the panel as the panel is moved through the apparatus.

Incremental crushing has been found to be particularly effective and preferred. Because only a portion of the crush is done at each roller, the crush is more controlled and less likely to tear the face sheet. Incremental crushing also allows for a greater total crush, i.e., greater reduction in height, than is generally available using a single crushing element.

The apparatus also preferably has a roller frame which supports the compression rollers and means for adjusting the vertical height and angular displacement of the roller frame with respect to the conveyor. The compression rollers can then be positioned at incrementally different heights with respect to the conveyor for incrementally laterally compressively deforming the panel.

The means for adjusting the height and angular displacement of the roller frame preferably is a pair of roller height adjusters operatively associated with the roller frame for adjusting the height and angular displacement of the roller frame.

Each of the compression rollers is preferably mounted on an elongate rotatable shaft supported on the roller frame. The shafts extend in spaced-apart and parallel relationship in the direction in which the panel is conveyed through the apparatus. Each of the compression roller shafts includes an elongate keyway formed therein and the compression rollers are slidingly mounted on the compression roller shafts respectively Each of the compression rollers includes a key adapted to be fitted within the keyway for locking the compression rollers on the compression roller shafts respectively This allows for easy changing of the type of compression roller used.

Alternatively, each of the shafts may include two or more spaced apart compression rollers for forming two recesses in the panel. One or more of the shafts may also include a circular knife mounted between the compression rollers for cutting the panel into two separate pieces.

The conveyor can be a belt type conveyor, or the compression rollers coupled to a drive source to rotate them to move the panels between the rollers and a support such as a flat plate, or preferably one or more conveyor rollers. The use of a plurality of conveyor rollers which are respectively aligned with a plurality of compression rollers is particularly preferred. This allows the crushing to be specially directed between respective compression and conveyor rollers and has been found to be particularly effective.

This in-line continuous nature of the present invention is particularly advantageous. Unlike prior vertical press methods which are labor intensive and slow, the present invention is continuous. The panels are fed into the apparatus which can be easily adjusted to provide the desired amount of crush. The apparatus of the present invention can be associated with a panel line, such as shown in U.S. Pat. No. 2,731,379 to Wheeler entitled "Method Of Making Honeycomb Material" (incorporated by reference) such that the panel can be formed on the panel line and directly fed into an apparatus of the present invention to provide direct production of the desired panels. The apparatus of the present invention can even be incorporated with a panel line and cut off saw for a high rate of production.

There are other advantages and features of the present invention which will be more readily apparent from the following detailed description of the preferred embodiments of the invention, the drawings, and the appended claims.

BRIEF DESCRIPTION OF THE DRAWINGS

In the accompanying drawings that form a portion of this disclosure:

FIG. 3 is a perspective view of a piece of a fully cushioned honeycomb panel made with the apparatus of FIG. 1;

FIG. 4 is a top plan view of a continuous in-line apparatus for cutting and crushing a honeycomb panel with an angle crush slit score;

FIG. 5 is a front elevational view of a circular knife and wedge compression roller combination for forming an angle crush slit score in a honeycomb panel;

FIG. 6 is a front elevational view of a honeycomb panel with an angle crush slit score formed therein using the apparatus of FIGS. 4 or 5;

FIG. 14 is a vertical cross-section of an alternate compression roller embodiment;

FIG. 15 is a side elevational view of a honeycomb panel made with the apparatus of FIG. 7 including the compression roller of FIG. 14;

FIG. 16 is a top perspective view of a honeycomb pallet;

FIG. 17 is a bottom perspective view of the pallet of FIG. 16; and

FIG. 18 is a partially broken elevational view, taken generally along the plane 18—18 in FIG. 8, of an alternative embodiment of the compression roller for making the pallet of FIGS. 16 and 17.

DESCRIPTION OF THE PREFERRED EMBODIMENTS

Figure 1:
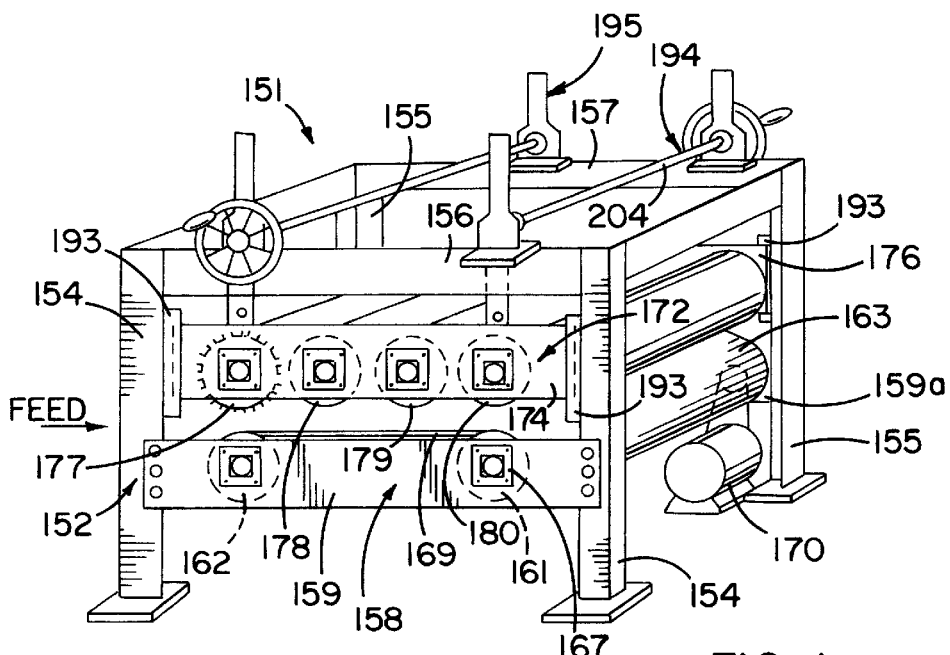
FIG. 1 is a perspective view of a continuous in-line apparatus for manufacturing a cushioned honeycomb panel.
Figure 2:
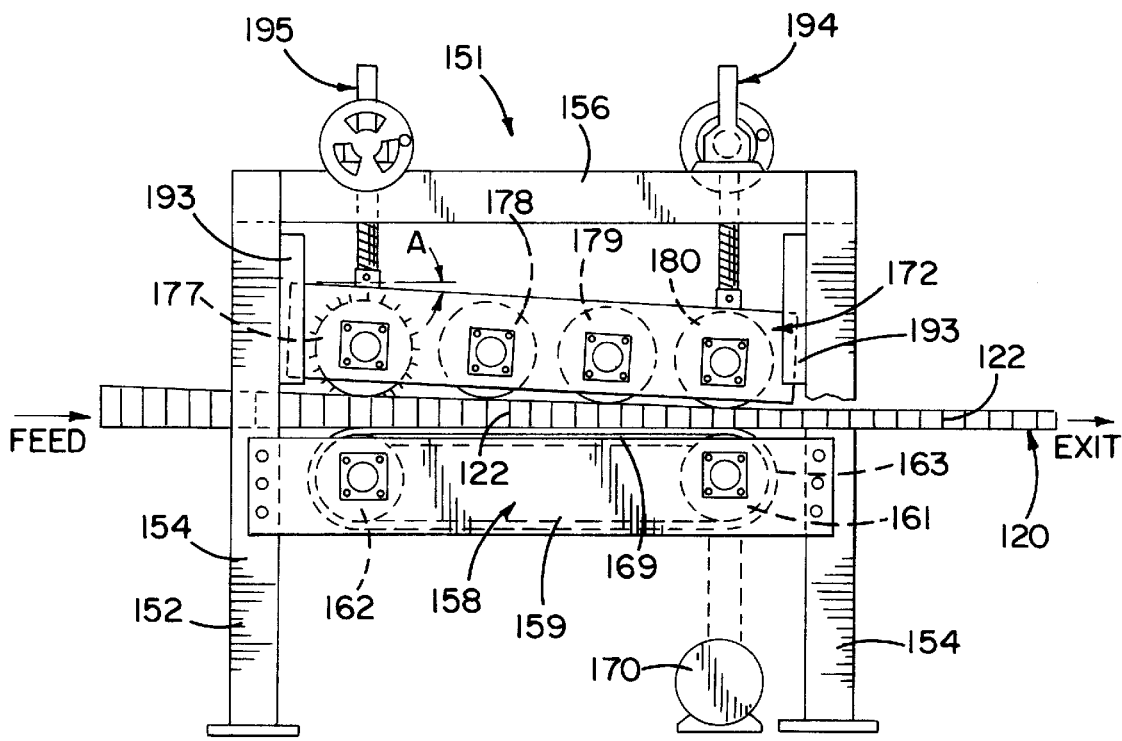
FIG. 2 is a side elevational view of the apparatus of FIG. 1 depicting a honeycomb panel being incrementally laterally crushed or deformed.

FIGS. 1 and 2 depict a continuous in-line apparatus 151 for manufacturing a honeycomb panel than can have a fully cushioned or crushed face portion such as the honeycomb panel 120 with a fully cushioned face portion 122 depicted in FIG. 3. The apparatus 151 is the subject of PCT Application Serial No. WO 94/27814 to Jaegers et al. published on Dec. 8, 1994 entitled "Prestressed Honeycomb, Method And Apparatus Therefor" the complete disclosure of which is incorporated herein by reference. The honeycomb panel 120 is disclosed in U.S. Pat. No. 5,540,972 to Jaegers et al. entitled "Prestressed Honeycomb, Method And Apparatus Therefor", the complete disclosure of which is also incorporated herein by reference.

Referring to FIGS. 1 and 2, the apparatus 151 comprises a support frame 152 including two elongate and upstanding front legs 154, two elongate and upstanding rear legs 155 and two horizontal support members 156 and 157 extending transversely between the legs 154 and 155, respectively. A honeycomb conveyor structure 158 is secured to the lower portion of the support frame 152. The conveyor structure 158 includes a pair of horizontal trusses 159 and 159a extending the length of the support frame 152 and transversely to the legs 154 and 155. The ends of the truss 159 are secured to the front legs 154 while the ends of the truss 159a are secured to the rear legs 155. A pair of spaced apart and parallel rolls 161 and 162 extend between and transversely to the trusses 159 and 159a.

A conveyor in the form of a conveyor belt 163 surrounds rolls 161 and 162. A horizontal support table 169, positioned below the conveyor belt 163, extends longitudinally between the rolls 161 and 162 and transversely the width of the support frame 152. A drive chain (not shown) surrounds the drive sprockets (not shown) on the ends of the two rolls 161 and 162 to allow the coupled and simultaneous rotation of the rolls 161 and 162. A drive assembly 170 is operably associated with the roll 161 for driving the rolls 161 and 162 and thus the conveyor belt 163.

The apparatus 151 further comprises a compression apparatus such as a compression roll frame 172 including a pair of horizontal trusses 174 and 176 which extend the length of the support frame 152 and between the legs 154 and 155, respectively. The ends of the truss 174 are secured to the upper portion of the two front legs 154 while the ends of the truss 176 are secured to the upper portion of the two rear legs 155. The apparatus 151 further includes crushing elements in the form of spaced apart and parallel elongate compression rollers 177–180 which extend between and transversely to the trusses 174 and 176.

The four compression rollers 177–180 are preferably connected together and operably associated with the drive motor assembly 170 for coupled and simultaneous rotation. Alternatively, the drive motor assembly 170 can be associated only with the compression rollers 177–180 and the conveyor belt 163 unpowered but free to move, or replaced by a flat plate.

A bracket 193 is secured to each of the legs 154 and 155. Each end of the trusses 174 and 176 is positioned within each of the brackets 193 respectively to allow the vertical movement of the roll frame 172 with respect to the support frame 152 while, at the same time, preventing the horizontal movement of the roll frame 172 with respect to the support frame 152.

The apparatus 151 further comprises a pair of roller height adjusters 194 and 195 which are operably associated with the roll frame 172 and independently operable to allow for the independent and varying vertical displacement of the ends of the roll frame 172 so that the roll frame 172 may be angularly displaced with respect to the support frame 152 and the horizontal table 169.

Referring to FIG. 2, the apparatus 151, and more particularly, the adjustable roll frame 172 thereon, allows for the incremental lateral crushing and compression of the honeycomb panel as it is conveyed through the apparatus and past the compression rollers 177–180. As shown in FIG. 1, the compression rollers 177–180 are as wide as the panel to form a fully cushioned or crushed honeycomb panel such as the panel 120 depicted in FIG. 3. Alternatively, the compression rollers can be smaller or of different shapes such as discussed below.

FIG. 4 depicts another in-line apparatus 200 for making a honeycomb panel 210 with an angle crush slit score 229 (FIG. 6). The apparatus 200 of FIG. 5 is disclosed in U.S. Pat. No. 5,466,211 to Komarek et al. entitled "Method And Apparatus For Manufacturing Articles Employing Folded Honeycomb Panels", the complete disclosure of which is incorporated herein by reference. The honeycomb panel 210 of FIG. 6 is disclosed in U.S. Pat. No. 5,511,667 to Carder entitled "Honeycomb Corner Protector", the complete disclosure of which is also incorporated herein by reference.

According to the apparatus 200 of FIG. 4, a honeycomb panel 210 is fed into a first station 230 where slits 218 are made using a slitting element in the form of a suitable industrial circular knife 235. The honeycomb panel 210 is then fed into a second station 234 where crushing elements in the form of wedge shaped compression rollers 236 are positioned to crush the honeycomb panel 210 along the slits 218 to form the honeycomb panel 210 of FIG. 6 with an angle crush slit score 229. Alternatively, the knives 235 may be positioned to cut between the compression rollers 236 to fully cut the panel 210 into separate pieces.

FIG. 5 depicts a wedge shaped compression roller 237 similar to the rollers 236 depicted in FIG. 4 except that the roller 237 additionally includes a cutting edge 249 around the circumference thereof for forming the angle crush slit score 229 in one step. The roller 237 is disclosed in U.S. Pat. No. 5,466,211 to Komarek et al. entitled "Method And Apparatus For Manufacturing Articles Employing Folded Honeycomb Panels", the complete disclosure of which is incorporated herein by reference. The compression rollers 236 or 237 and circular knifes 235 or 249 of FIGS. 4 and 5 can replace one or more of the compression rollers 177–180 of FIGS. 1 and 2.

Figure 10:
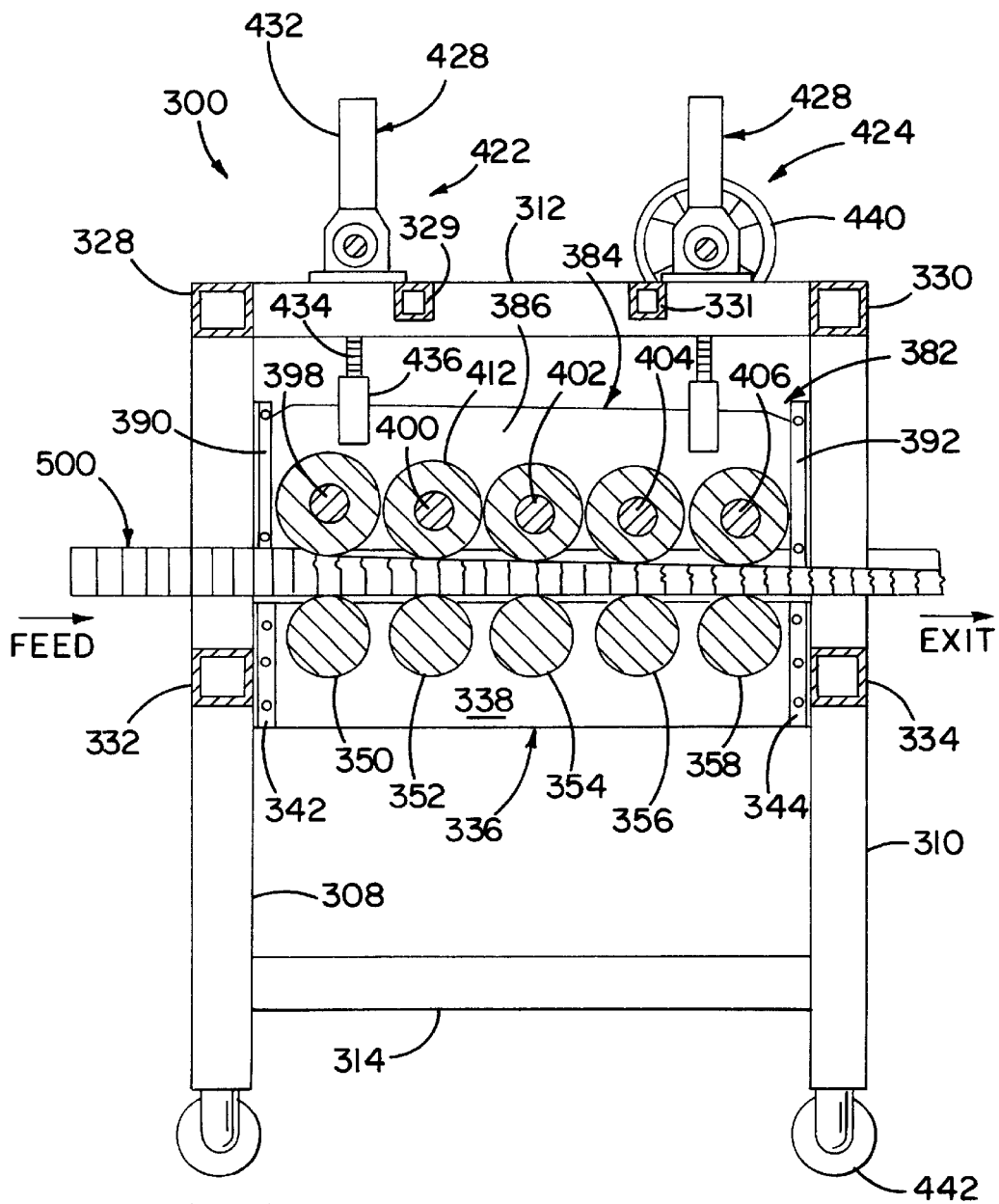
FIG. 10 is a vertical cross-section of the apparatus and the honeycomb panel of FIG. 7 taken generally along the plane 10—10 of FIG. 7 and depicting the honeycomb panel being incrementally deformed or crushed to form the recess.
Figure 11:
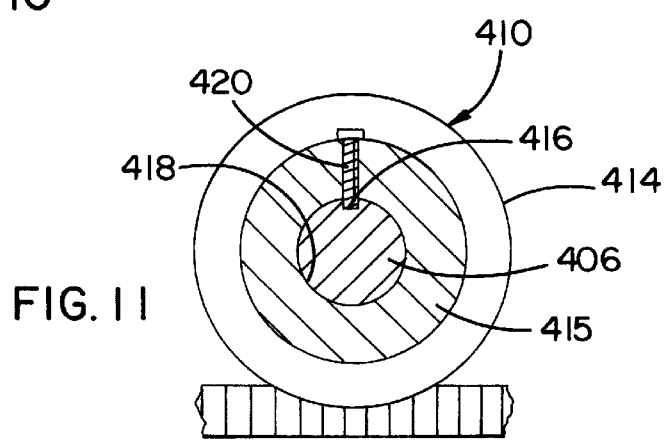
FIG. 11 is an enlarged, partially broken, vertical cross-section of one of the compression rollers of the apparatus of FIG. 7 taken generally along the plane 11—11 in FIG. 7.
Figure 12:
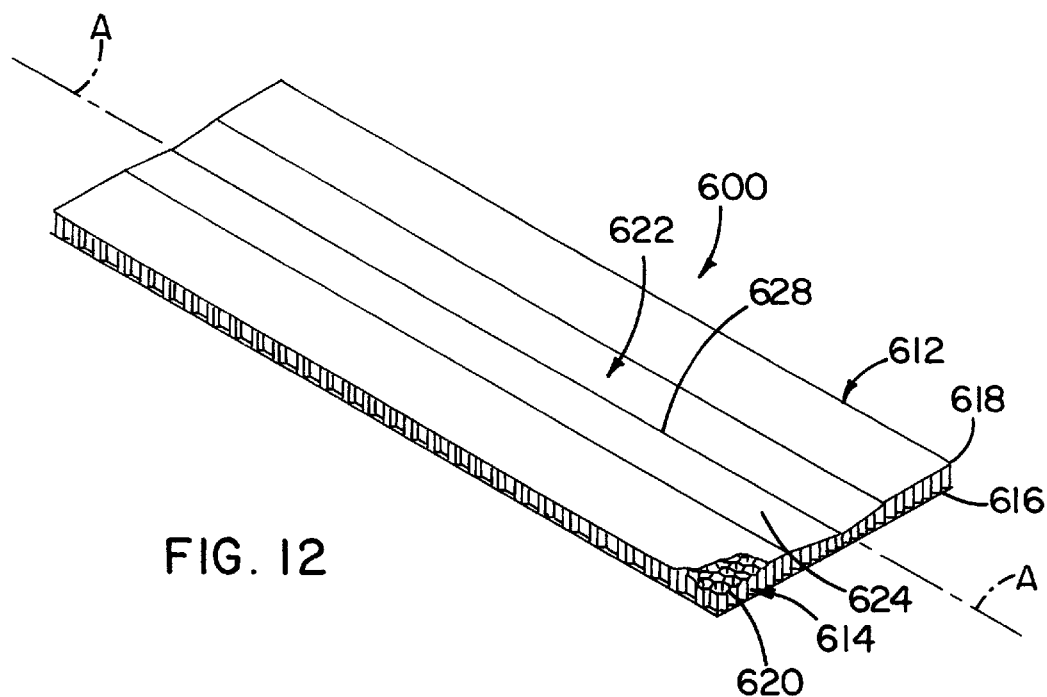
FIG. 12 is a perspective view of a honeycomb roll spacer which is made using the apparatus of FIGS. 7–10.

FIGS. 7–11 depict an apparatus 300 which can be used for making the recessed roll spacer 600 depicted in FIG. 12. The roll spacer 600 is the subject of and is disclosed in U.S. patent application Ser. No. 08/497,947 to Bourgeois et al. filed on Jul. 3, 1995 entitled "Honeycomb Roll Spacer", the complete disclosure of which is incorporated herein by reference.

The spacer 600 comprises a substantially flat panel 612 of honeycomb material including a honeycomb core 614 that is sandwiched between face sheets 616 and 618 secured to opposite faces of the core 614. The core 614 is comprised of a plurality of honeycomb cells 620 disposed generally perpendicularly to the face sheets 616 and 618. Preferably, the honeycomb core 614 and face sheets 616 and 618 are made of fully recyclable and biodegradable recycled kraft paper.

A generally concavely shaped recess 622 is formed in the panel 612. The recess 622 has a bottom concavely curved surface 624 including a centrally disposed elongate aperture defined by a slit 628 that is cut into the face sheet 618 and which extends the length of the recess 622 and the panel 612 along and co-linearly with the longitudinal axis A of the panel 612. The slit 628 is preferably positioned centrally on the face sheet 618 in the region of the face sheet 618 overlying the bottom surface 624 of the recess 622.

The recess 622 is defined by a central, longitudinal portion of the panel 612 in which the honeycomb core 614 and face sheet 618 have been compressively deformed to a predetermined depth using the apparatus 300 depicted in FIGS. 7–11.

The apparatus 300 as shown has a support frame 302 including a front leg assembly 304 and a back leg assembly 306 that is longitudinally spaced from the front leg assembly 304. The front leg assembly 304 includes two elongate and upstanding spaced-apart front legs 308 and 310, a top cross support member 312 extending horizontally and transversely between the legs 308 and 310 at the top of the leg assembly 304 and a bottom cross support member 314 extending horizontally and transversely between the legs 308 and 310 at the bottom of the leg assembly 304.

The back leg assembly 306 (FIG. 8) includes two elongate and upstanding spaced-apart back legs 316 and 318, a top cross support member 320 extending horizontally and transversely between the legs 316 and 318 at the top of the leg assembly 306 and a bottom cross support member 322 extending horizontally and transversely between the legs 316 and 318 at the bottom of the leg assembly 306.

The support frame 302 further includes first and second bottom elongate horizontal frame members 324 and 326 extending horizontally and transversely between and unitary with the bottom of the front and back leg assemblies 304 and 306. The member 324 extends transversely and unitary between the legs 308 and 316 of the front and back leg assemblies 304 and 306 respectively The member 326 is disposed parallel to the member 324 and extends transversely and unitarily between the legs 310 and 318 of the front and back leg assemblies 304 and 306 respectively. The members 324 and 326 are disposed co-planarly with, and transversely to, the bottom cross support members 314 and 322 of the front and back leg assemblies 304 and 306 respectively.

The support frame 302 also includes first and second elongate top horizontal frame members 328 and 330 extending transversely between and unitary with the top of the front and back leg assemblies 304 and 306. Member 328 extends transversely and unitarily between the legs 308 and 316 of the front and back leg assemblies 304 and 306 respectively. Member 330 is disposed generally parallel to and co-planar with the member 328 and extends transversely and unitarily between the legs 310 and 318 of the front and back leg assemblies 304 and 306 respectively Members 328 and 330 are disposed coplanarly with, and transversely to, the top cross support members 312 and 320 of the front and back leg assemblies 304 and 306 respectively.

Two additional elongate top horizontal frame members 329 and 331 are disposed between the first and second top horizontal frame members 328 and 330.

The support frame 302 further includes first and second intermediate horizontal side frame members 332 (FIG. 10) and 334 extending between and unitary with the central portions of the front and back leg assemblies 304 and 306. In particular, frame member 332 extends transversely and unitarily between the legs 308 and 316 of the front and back leg assemblies 304 and 306 respectively. Member 332 is vertically co-planar with and is disposed between the bottom frame member 324 and the top frame member 328. Member 334 is disposed generally horizontally co-planarly with the member 332 and extends transversely and unitarily between the legs 310 and 318 of the front and back leg assemblies 304 and 306 respectively Further, the member 334 is vertically co-planar with and disposed between the bottom frame member 326 and the top frame member 330.

Figure 7:
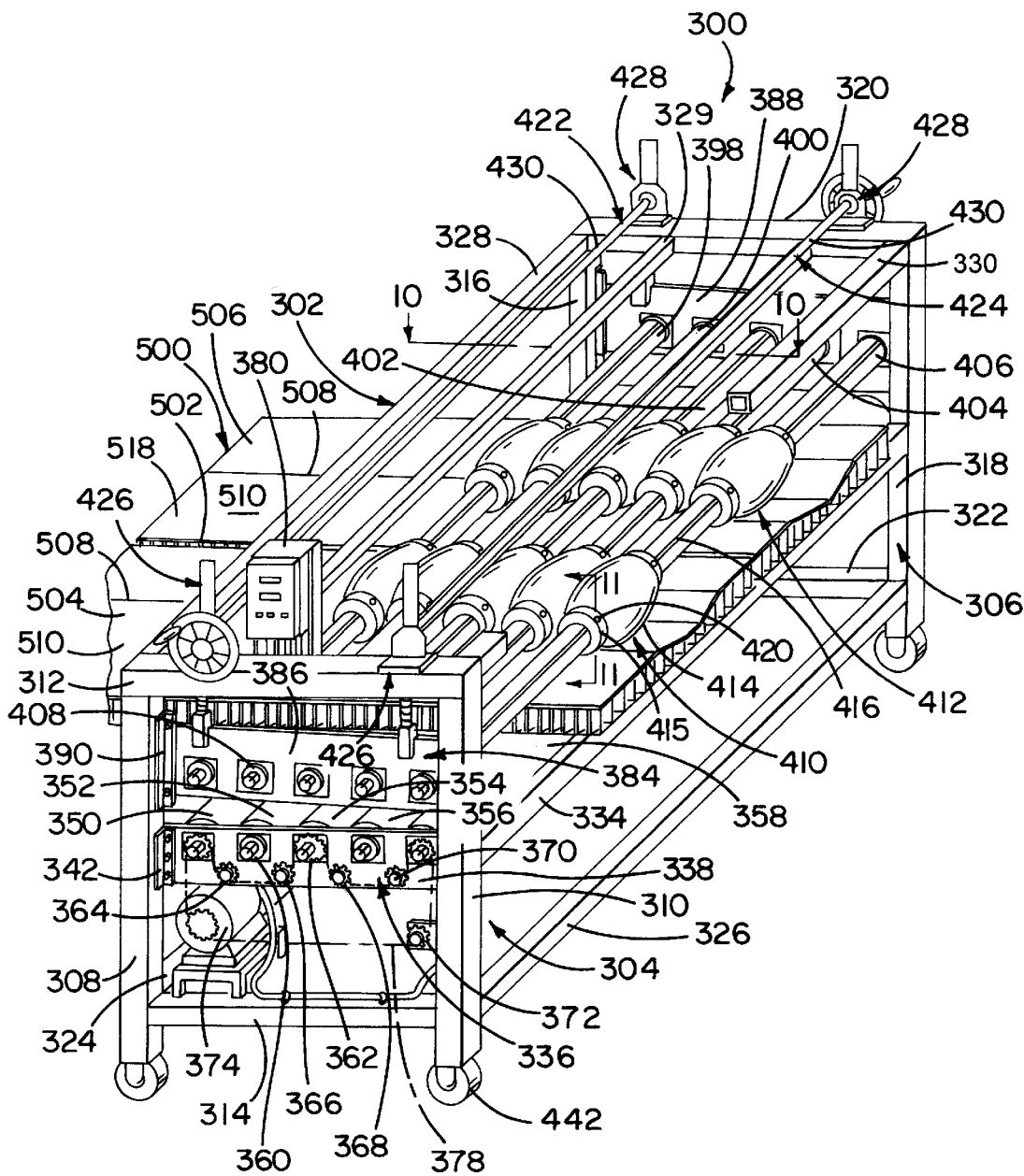
FIG. 7 is a perspective view of a continuous in-line apparatus for manufacturing roll spacers.
Figure 8:
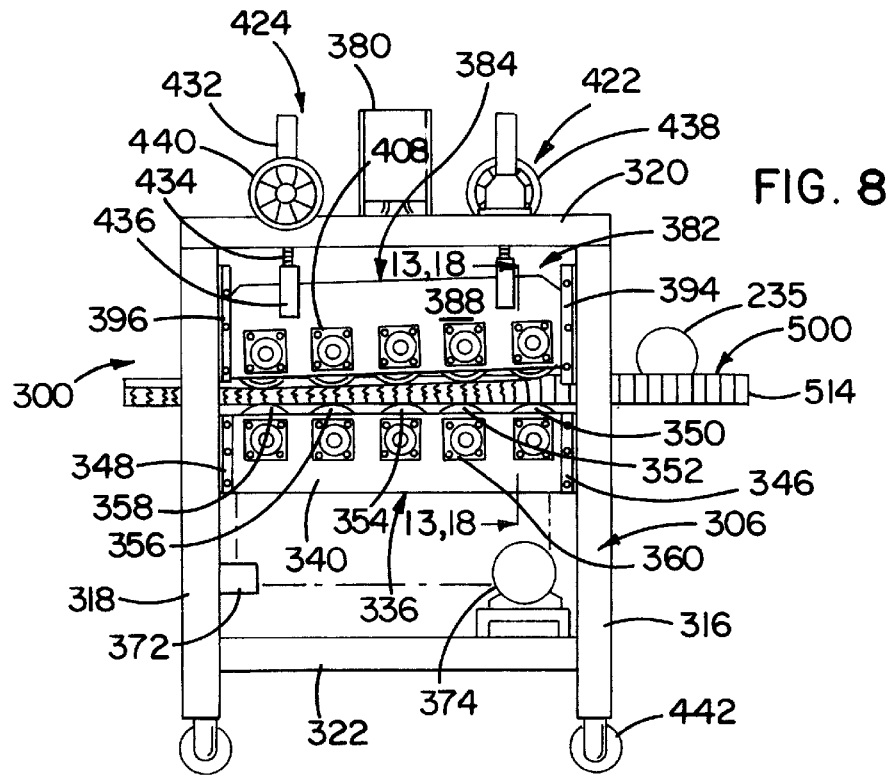
FIG. 8 is a side elevational view of the apparatus of FIG. 7 from the reverse side, the honeycomb panel being shown in vertical cross-section along the recess therein.
Figure 9:
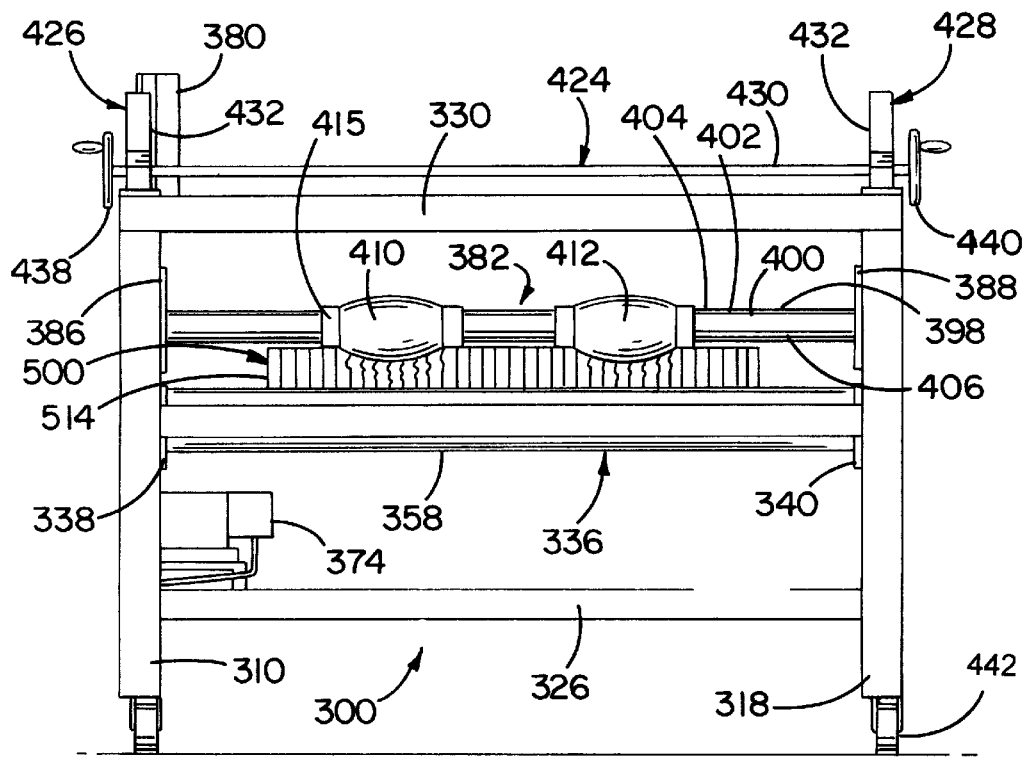
FIG. 9 is a front elevational view of the exit end of the apparatus of FIG. 7, the honeycomb panel being shown exiting the apparatus.

A horizontal conveyor structure 336 is mounted within the support frame 302 for moving a honeycomb panel 500 horizontally through the apparatus 300. The conveyor structure 336 includes first and second horizontal trusses 338 and 340 (FIG. 8) mounted to the front and back leg assemblies 304 and 306 respectively The truss 338 extends horizontally and transversely between and is mounted at opposite ends thereof to the legs 308 and 310 of the front leg assembly 304 and, more particularly, to brackets 342 and 344 mounted to the inside face of the legs 308 and 310 respectively (FIG. 7). The truss 340 extends horizontally and transversely between and is mounted at the opposite ends thereof to the legs 316 and 318 of the back leg assembly 306 and, more particularly, to brackets 346 and 348 mounted to the inside face of the legs 316 and 318 respectively (FIG. 8). The trusses 338 and 340 are disposed on the support frame 302 horizontally co-planarly with each other and the intermediate side support frame members 332 and 334.

The conveyor structure 336 further includes a plurality of elongate, spaced-apart, parallel and coplanarly disposed conveyor rollers 350, 352, 354, 356 and 358 respectively extending horizontally the length of the support frame 302 between the trusses 338 and 340 in the direction in which the honeycomb panel 500 is conveyed through the apparatus 300. The ends of each of the rollers are journalled for rotation in bearings 360 disposed in the trusses 338 and 340.

Each of the conveyor rollers 350, 354 and 358 includes a drive sprocket 362 coupled to the end thereof extending outwardly from the outer surface of the truss 338 (FIG. 7). The truss 338 also includes four spaced-apart drive sprockets 364, 366, 368 and 370 extending outwardly from the outer surface thereof The drive sprockets 364, 366, 368 and 370 are positioned on the truss 338 below the rollers 350, 352, 354, 356 and 358 in an arrangement wherein drive sprocket 364 is positioned between the rollers 350 and 352, the drive sprocket 366 is positioned between the rollers 352 and 354, the drive sprocket 368 is positioned between the rollers 354 and 356, and the drive sprocket 370 is positioned between the rollers 356 and 358. Another drive sprocket 372 extends inwardly from the interior face of the leg 310 of front leg assembly 304. In place of conveyor rollers, a conveyor belt as discussed can also be used.

A drive motor assembly 374 is mounted to the bottom of the support frame 302. A drive chain 378, associated with the drive motor assembly 374, surrounds each of the roller drive sprockets for providing rotational movement to the rollers 350, 354 and 358. More particularly, the drive chain 378 moves upwardly from the drive motor towards the truss 338 around the drive sprocket 362 on roller 350, then downwardly and around drive sprocket 364 then laterally around drive sprocket 366, then upwardly and around the drive sprocket 362 on roller 354, then downwardly and around the drive sprocket 368, then laterally and around drive sprocket 370, then upwardly and around the drive sprocket 362 on roller 358, then downwardly and around the drive sprocket 372 and finally laterally back to the drive sprocket 376 of the drive motor assembly 374.

The speed of the drive motor 374 and thus the rotational speed of the rollers 350, 352, 354, 356 and 358 is controlled through a drive motor control assembly 380 which is mounted to the top cross support member 312 of the front leg assembly 304 of the support frame 302 and is operatively associated and connected to the drive motor assembly 374. The use of respectively mounted compression and conveyor rollers as can best be seen in FIG. 8, has been found to be particularly effective, both in speed and quality, for the production of panels.

The apparatus 300 further comprises a compression assembly 382 for compressively deforming and crushing at least a portion of the top face sheet 518 and a portion of the honeycomb core 514 (FIG. 8) of the honeycomb panel 500 as it is conveyed through the apparatus 300 to form the concave recess 622 of the roll spacer 600 (FIG. 12).

The compression assembly 382 includes a compression roller frame 384 mounted within the support frame 302 generally above the conveyor structure 336. The compression roller frame 384 includes first and second horizontal co-planar trusses 386 and 388 mounted to the front and back leg assemblies 304 and 306 respectively. The truss 386 extends transversely between and is mounted to and between the legs 308 and 310 of the front leg assembly 304. Removable slide bars 390 and 392 are secured to the interior faces of the front legs 308 and 310 respectively. The ends of the truss 386 are positioned in the slide bars 390 and 392 respectively to allow the vertical upward and downward sliding movement of the truss 386 about the support frame 302. The truss 386 is positioned above and generally vertically coplanarly with the truss 338 of the conveyor structure 336.

The truss 388 extends transversely between and is mounted to the legs 316 and 318 of the back leg assembly 306. Removable slide bars 394 and 396 are secured to the interior face of the legs 316 and 318 respectively. The ends of the truss 388 are positioned in the slide bars 394 and 396 respectively to allow the vertical upward and downward sliding movement of the truss 388 about the support frame 302. The truss 388 is positioned above and generally vertically co-planarly with the truss 340 of the conveyor structure 336.

The compression roller frame 384 supports a plurality of elongate, spaced-apart and parallel cylindrical compression roller shafts 398, 400, 402, 404 and 406 which extend the length of the support frame 302 between the trusses 386 and 388. The ends of each of the roller shafts are journalled for rotation in bearings 408 mounted in the trusses 386 and 388 respectively. Referring to FIGS. 7 and 11, each of the roller shafts includes a key in the form of a groove 416 which protrudes inwardly into the surface thereof and extends the length thereof.

The compression roller shafts 398, 400, 402, 404 and 406 are positioned vertically co-planarly with the conveyor rollers 350, 352, 354, 356 and 358 respectively of the conveyor structure 336 in the direction in which the honeycomb panel 500 is conveyed through the apparatus 300.

Although not shown, the compression roller shaft may alternatively be operatively coupled to the drive motor assembly 374 for driving the compression roller shafts and moving the panel 500 through the apparatus 300.

Each of the compression roller shafts support crushing elements in the form of first and second spaced-apart generally elliptically or oval shaped compression rollers 410 and 412 mounted thereon. The compression rollers 410 and 412 on the compression roller shafts are respectively aligned to each other so as to form two parallel rows of compression rollers 410 and 412. Referring to FIGS. 7 and 11, each of the compression rollers 410 and 412 includes an elliptically or oval shaped central body 414 in longitudinal cross section and a unitary generally cylindrically shaped collar 415 extending outwardly from each end of the body 414. An elongate cylindrical bore 418 extends longitudinally through each of the compression rollers and, more particularly, through the collars 416 and body 414 thereof. A key in the form of a screw 420 extends through one of the collars 415. Each of the compression rollers 410 and 412 are slidingly mounted on their respective compression roller shafts for longitudinal movement along the length thereof The screw 420 on each of the compression rollers 410 and 412 extends into the keyway 416 in the respective compression roller shaft to lock the respective compression roller onto the respective compression roller shaft.

The compression assembly 382 further includes first and second spaced-apart compression roller height adjusters 422 and 424 secured to the top of the support frame 302 and operatively associated with the compression roller frame 384 for varying the vertical and angular displacement of the compression roller frame 384 with respect to the support frame 302 and positioning the compression roller shafts 398, 400, 402, 404 and 406 and the compression rollers 410 and 412 thereon at incrementally different heights with respect to the conveyor structure 336.

Each of the compression roller height adjusters 422 and 424 includes co-linearly disposed collar assemblies 426 and 428 and an elongate and rotatable connector shaft 430 extending horizontally between and operably associated with the collar assemblies 426 and 428.

The collar assemblies 426 and 428 of the compression roller height adjuster 422 are fixed to the top face of the top cross support members 312 and 320 respectively of the front and back leg assemblies 304 and 306 respectively and spaced from, and adjacent to, the top side horizontal frame member 328. The connector shaft 430 of roller height adjuster 422 is spaced from and extends parallel to the side horizontal frame member 328.

The collar assemblies 426 and 428 of the compression roller height adjuster 424 are fixed to the top face of the top cross support members 312 and 320 respectively of the front and back leg assemblies 304 and 306 respectively and spaced from, and adjacent to, the top side horizontal frame member 330. The connector shaft 430 of the roller height adjuster 424 is spaced from, and extends parallel to, the top side horizontal frame member 330.

Referring to FIGS. 8 and 10, each of the collar assemblies 426 and 428 includes a collar 432, an elongate post 434 extending downwardly through the collar 432, and a U-shaped bracket 436 extending unitary from the lower end of the post 434. The top ends of the trusses 386 and 388 of the compression assembly 382 are securely received within the brackets 436 of the collar assemblies 426 and 428.

A first manually operable and rotatable wheel or handle 438 is operatively connected to the collar assembly 426 and shaft 430 of roller height adjuster 422. A second manually operable and rotatable wheel or handle 440 is operatively connected to the collar assembly 428 and the connector shaft 430 of the roller height adjuster 424.

The rotation of each of the wheels 438 and 440 causes the rotation of the respective connector shaft 430 which, in turn, causes the simultaneous and coupled vertical movement of the posts 434 on each of the collar assemblies 426 and 428 which, in turn, causes the vertical displacement of the ends of the trusses 386 and 388 of the compression assembly 382.

The roller height adjusters 422 and 424 are independently operable to allow for the independent and varying vertical displacement of the ends of the trusses 386 and 388 so that the compression assembly 382 may be angularly displaced with respect to the support frame 302.

The mechanism associated with each of the collar assemblies 426 and 428 and the posts 434 for converting the rotary motion of the connector shafts 430 into the vertical movement of posts 434 may comprise any suitable mechanism including, but not limited to, the use of a worm gear in collar assemblies 426 and 428 cooperating with teeth on the posts 434.

Although each of the compression roller shafts are mounted to a single unitary compression roller frame 384, it is understood that each of the compression roller shafts could alternatively be mounted on its own separate compression roller frame operatively associated with separate compression roller frame height adjusters respectively, so as to be vertically independently adjustable to allow the positioning of the compression roller shafts at incrementally different heights with respect to the conveyor structure 336. In addition, a shaft mounting a circular knife can also be added to the frame or a circular knife to replace one or more of the rollers shown.

Referring to FIG. 10, the apparatus 300, and more particularly, the adjustable compression roller frame 384 thereon, allows for the incremental compression or crushing of at least a portion of the honeycomb panel 500 as it is conveyed through the apparatus 300 to form the honeycomb roll spacer 600 of FIG. 12 which includes the recess 622.

The roll spacer 600 (FIG. 12) is made with the apparatus 300 as described below. Initially, the compression roller frame 384 is positioned at a predetermined height and angle with respect to the support frame 302 and the conveyor structure 336 by adjusting each of the compression roller height adjusters 422 and 424 as described above.

A strip of honeycomb panel or panel 500 is then fed through the apparatus 300. As shown in FIG. 7, the panel 500 which is fed into the apparatus 300 has precut therein a longitudinally extending central slit 502 which separates the honeycomb panel 500 into two separate honeycomb panel pieces 504 and 506. Each of the panel pieces 504 and 506, in turn, includes a longitudinally extending central slit 508 extending only through the top face sheets 510 thereof which corresponds to the slit 628 in the roll spacer 600 (FIG. 12).

The honeycomb panel 500 may be cut and slitted as described above at a station preceding the apparatus 300 similar in structure to the first station 230 of the apparatus 200 including slitting elements in the form of three circular knifes 235 appropriately positioned on the shaft 230 for cutting the slits 502 and 508 in the panel 500. One such knife 235 is shown schematically at the inlet side of the apparatus in FIG. 8. The apparatus 300 includes wheels 442 so that it can easily be positioned in front of, for example, the first station 230 of the apparatus 200.

Figure 13:
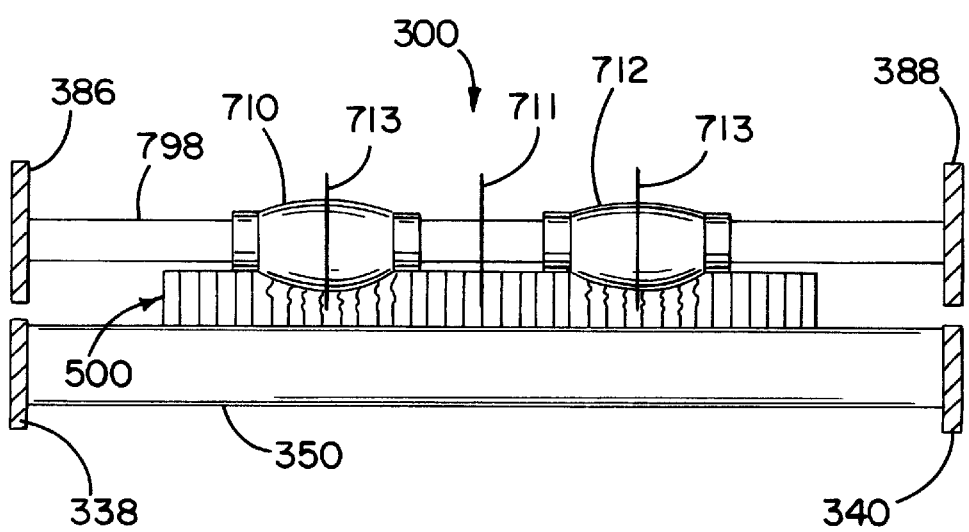
FIG. 13 is a partially broken elevational view, taken generally along the plane 13—13 in FIG. 8 of an alternate embodiment of the first compression roller shaft of the apparatus of FIG. 7.

Alternatively, and referring to FIG. 13 which shows an alternate embodiment 798 of the first compression roller shaft 398 of the apparatus of FIG. 7, the slit 502 in the panel 500 may be cut by slitting elements in the form of a circular knife 711 mounted at the center of the first compression roller shaft 798 and that the slits 508 can be cut by circular knifes or cutting edges 713 mounted centrally to the outer surface of the compression rollers 710 and 712 respectively Although not shown, the knife 711 can likewise be mounted to any other compression roller shaft including the last compression roller shaft 406 in FIG. 7.

Referring back to FIG. 7, the honeycomb panel 500 is then conveyed by the conveyor rollers 350, 352, 354, 356 and 358 through the apparatus 300 and, more particularly, past the two spaced-apart rows of aligned compression rollers 410 and 412 of the compression assembly 382. The conveyor structure 336 supports and prevents the buckling of the honeycomb panel 500 as it is compressed and conveyed through the apparatus 300.

Due to the angular displacement of the compression roller frame 384, each of the compression rollers 410 and 412 is positioned at an incrementally different height with respect to the conveyor structure 336 and the top face sheet 510 of the honeycomb panel 500. As a result, the compression rollers 410 and 412 on the first compression roller shaft 398 compress two spaced-apart portions of the face sheet 510 and the honeycomb core 514 of the honeycomb panel segments 504 and 506 to a first depth while successive compression rollers 410 and 412 on successive compression roller shafts 400, 402, 404 and 406 further compress the same portions of the face sheet 510 and the honeycomb core 514 to incrementally greater depths until the honeycomb panel 500 is conveyed past all of the compression rollers 410 and 412.

As an example, to form a honeycomb roll spacer 600 (FIG. 12) having a recess 622 with a depth of 2 inches (5 centimeters) from a honeycomb panel 500 having a thickness of 3.5 inches (8.75 centimeters), the end of the compression roller frame 384 adjacent the inlet of the apparatus 300 would be positioned (via roller height adjuster 422) approximately 3.38 inches (8.57 centimeters) away from the conveyor structure 336 while the end of the compression roller frame 384 adjacent the outlet of the apparatus 300 would be lowered and positioned (via roller height adjuster 424) approximately 2.75 inches (6.95 centimeters) away from the conveyor structure 336 at an angle of approximately 10 degrees with respect to the horizontal, such that the face sheet 510 and core 514 of the honeycomb panel segments 504 and 506 are incrementally laterally deformed a total depth of approximately 2.5 inches (6.25 centimeters) The compression assembly 382 would be positioned to compress the honeycomb panel 500 a depth of 2.5 inches, rather than 2 inches, since a compressed core portion partially recovers its memory, i.e., 0.5 inches (1.3 centimeters) after compression.

The incremental lateral compression or crushing of the honeycomb panel 500 is advantageous because it eliminates the uneven deformation and damage to the partition walls of the honeycomb core 514 which results when the honeycomb core 514 is compressed to a predetermined depth in one step as with, for example, a press. The incremental compression allows for the gradual and incremental application of pressure to the partition walls, thus allowing for the even deformation and no damage to the panel. The incremental and gradual application of pressure also minimizes the possibility of bursting of the partition walls or face sheets which sometimes occurs when a honeycomb panel is compressed in one step.

To minimize damage or tearing of the top face sheet 510 as it is compressed, the honeycomb panel 500 is preferably conveyed through the apparatus 300 immediately after the face sheets have been adhesively secured to the core 514 to form the honeycomb panel 500 in a panel line. The adhesive is not yet fully cured. Damage or tearing of the top face sheet during compression by the compression rollers 410 and 412 is further minimized by the slit 508 in each of the panel segments 504 and 506 respectively.

Although not shown, after the panel 500 and, more particularly, the recessed panel pieces 504 and 506 exit the apparatus 300, the panels 504 and 506 are cut along their width at any desired length intervals.

The final product is a honeycomb roll spacer 600 such as that shown in FIG. 12 including a generally concavely shaped recess 622 suitable for receiving and cushioning a roll of web material such as paper, steel, copper or the like for transport and storage in either a horizontal or vertical orientation in a truck, railcar, or the like.

Although the apparatus 300 described above includes two rows of compression rollers 410 and 412, the invention encompasses an apparatus 300 having only one row of compression rollers or three or more rows of compression rollers depending upon the desired roll spacer production rate.

The generally elliptically shaped compression rollers 410 and 412 may be substituted with any other suitably configured and shaped compression rollers such as the wedge shaped compression rollers 236 of FIG. 4 for making angle crush slit scores.

They could also be substituted with, for example, the compression roller 810 depicted in FIG. 14 for making the honeycomb panel 800 of FIG. 15. The compression roller 810 differs from the compression roller 410 depicted in FIG. 11 in that it is elliptical in transverse cross-section to make a honeycomb panel 800 including a plurality of parallel concavely shaped recesses 822 which extend along the length thereof and are adapted to receive and cushion items such as bottles or the like for storage and shipment.

The apparatus 300 may also be adapted for manufacturing other types of recessed honeycomb products such as the honeycomb pallet 900 depicted in FIGS. 16 and 17 which comprises a honeycomb panel 911 including three longitudinally extending and generally rectangularly shaped legs 913, 915 and 917 which are defined in the panel 912 by forming two spaced apart longitudinally extending and generally rectangularly shaped recesses 919 and 921 in the honeycomb core of the panel 911. Each of the recesses 919 and 921 includes a bottom surface 923 and side surfaces 925 and 927. The bottom surface 923 is formed with the apparatus 300 by substituting the generally elliptically shaped compression rollers 410 and 412 thereon with generally cylindrically shaped compression rollers 910 and 912, as shown in FIG. 18, which include a flat outer surface 914. The circular knifes 929 and 931 mounted to the sides of each of the compression rollers 910 and 912 cut slits into the panel 911 as the panel 911 is being compressed to form the side surfaces 925 and 927 of the recesses 919 and 921 respectively.

Although FIG. 7 depicts an embodiment of the present invention wherein the panel is conveyed and moved through the apparatus with respect to fixed compression rollers, the present invention encompasses an apparatus where the compression rollers are conveyed and moved past a fixed panel for compressing and crushing the panel.

The foregoing is illustrative of the principles of the invention. Further, since numerous modifications and changes will readily occur to those skilled in the art, it is not desired to limit the invention to the exact construction and operation shown and described. Accordingly, all suitable modifications and equivalents may be resorted to while still falling within the scope of the invention.

What is claimed is:

1. A method of crushing at least a portion of a honeycomb panel comprising the steps of:
    a) slitting a portion of the honeycomb panel;
    b) providing a crushing element for compressively deforming said portion of the honeycomb panel to a predetermined depth; and
    c) conveying the panel past the crushing element such that the crushing element compresses said portion of the panel.

2. A method of crushing at least a portion of a honeycomb panel comprising the steps of:
    a) cutting a slit in the panel adjacent each side of the portion of the panel which is deformed;
    b) providing a crushing element for compressively deforming said portion of the honeycomb panel to a predetermined depth; and
    c) conveying the panel past the crushing element such that the crushing element compresses said portion of the panel.

3. A method of crushing at least a portion of a honeycomb panel comprising the steps of:
    a) providing a generally elliptically shaped crushing element for compressively deforming at least a portion of the honeycomb panel to predetermined depth to form a generally concavely shaped recess in the panel; and
    b) conveying the panel past the crushing element such that the crushing element compresses the portion of the panel.

4. The method of claim 3 wherein the panel is moved along a conveyor and further comprising the step of providing another crushing element for further compressively deforming the panel at another point along the conveyor.

5. The method of claim 3 wherein step b) comprises the step of moving the panel along a conveyor and step a) comprises the steps of compressively deforming at least a portion of the panel to a first predetermined depth and then compressively deforming the same portion of the panel to a second predetermined depth.

6. The method of claim 3 wherein step b) comprises the step of moving the panel along a conveyor and step a) comprises the step of providing a plurality of spaced-apart and aligned crushing elements and incrementally compressively deforming at least a portion of the panel to a predetermined depth to form a recess in the panel.

7. The method of claim 3 wherein step a) comprises the step of providing a generally cylindrically shaped crushing element and forming a generally rectangularly shaped recess in the panel.

8. The method of claim 3 further comprising the step of simultaneously slitting and deforming the portion of the honeycomb panel to form the recess.

9. The method of claim 3 further comprising the step of slitting the portion of the honeycomb panel which is crushed prior to step a).

10. The method of claim 3 further comprising the step of compressively crushing another portion of the honeycomb panel to form another recess in the panel and cutting the panel between the recesses to form two panels.

11. The method of claim 3 further comprising the step of cutting a slit in the panel adjacent each side of the portion of the honeycomb panel which is deformed prior to step a).

12. The method of claim 3 where the panel includes a honeycomb core and opposite face sheets, the method further comprising the step of moving the panel through the apparatus after the face sheets have been adhesively secured to the honeycomb core but before the glue has fully cured.

13. An apparatus for at least partially crushing a honeycomb panel comprising:
    a) a generally elliptical compression roller for compressively crushing at least a portion of the panel; and
    b) a conveyor for moving the panel and the compression roller with respect to each other such that the compression roller compresses the portion of the panel as the panel and the compression roller are moved with respect to each other.

14. The apparatus of claim 1, further comprising means for varying the height of the compression roller with respect to the panel to vary the depth to which the honeycomb panel is compressively crushed.

15. The apparatus of claim 1 wherein the compression roller is at least as wide as the panel to crush the entire panel.

16. The apparatus of claim 1 wherein the compression roller is mounted on an elongate rotatable shaft which extends above the panel.

17. The apparatus of claim 1 further including a knife for cutting through at least one surface of the panel as the panel is conveyed through the apparatus.

18. The apparatus of claim 13 further including a plurality of rotatable shafts mounted above the conveyor, at least one of the shafts having said compression roller mounted thereon.

19. The apparatus of claim 18 further including a circular knife mounted on one of the other shafts.

20. The apparatus of claim 13 wherein said compression roller is mounted on an elongate rotatable shaft extending above the panel, the apparatus further comprising first and second circular knifes mounted to the shaft and positioned at opposed ends of the compression roller for simultaneously slitting and crushing the portion of the panel.

21. The apparatus of claim 1 wherein the compression roller is mounted on an elongate rotatable shaft which extends above the panel, the shaft being operably coupled to a drive means for driving the shaft and moving the panel.

22. The apparatus of claim 13 wherein the compression roller is mounted on an elongate rotatable shaft extending above the panel, the compression roller including an outer surface having a knife edge extending circumferentially thereon for simultaneously cutting and crushing the portion of the panel.

23. The apparatus of claim 1 wherein the conveyor is a belt conveyor for moving the panel past the crushing element.

24. The apparatus of claim 1 wherein the conveyor comprises a plurality of conveyor rollers for moving the panel past the crushing element.

25. The apparatus of claim 13 further including a slitting element preceding the compression roller for slitting the portion of the honeycomb panel which is deformed by the compression roller.

26. The apparatus of claim 13 wherein the apparatus comprises a plurality of said compression rollers positioned opposite the conveyor from the panel in spaced apart relation from each other in the direction in which the honeycomb panel is moved through the apparatus, each of the compression rollers being positioned as an incrementally different height with respect to the conveyor for incrementally compressively crushing the portion of the panel as the panel is moved through the apparatus.

27. The apparatus of claim 26 wherein each of the compression rollers is mounted on an elongate rotatable shaft, the shafts extending in spaced-apart and parallel relationship in the direction in which the panel is conveyed through the apparatus, each of the compression rollers capable of forming a concavely shaped recess in the panel.

28. The apparatus of claim 26, further comprising a roller frame supporting the compression rollers and means for adjusting the vertical height and angular displacement of the roller frame with respect to the conveyor such that the compression rollers are positioned at incrementally different heights with respect to the conveyor for incrementally laterally compressively crushing the panel.

29. The apparatus of claim 28 wherein the means for adjusting the height and angular displacement of the roller frame comprises a roller height adjuster operatively associated with the roller frame for adjusting the height and angular displacement of the roller frame.

30. The apparatus of claim 28, further comprising a support frame and a plurality of slide bars secured to the support frame, the roller frame being supported by the plurality of slide bars respectively to allow for the vertical movement of the roller frame with respect to the support frame.

31. An apparatus for crushing at least a portion of a honeycomb panel including a honeycomb core, said apparatus comprising:

a) a support frame;
b) a conveyor on the support frame for conveying the panel;
c) a roller frame above the conveyor and the panel, the roller frame being mounted for vertical and angular displacement about the support frame;
d) a plurality of parallel generally elliptically shaped crushing elements mounted on the roller frame and extending thereon in the direction in which the panel is conveyed on the conveyor, each of the crushing elements compressively crushing at least a portion of the panel to form a generally concave shaped recess in the panel by compressively deforming said honeycomb core to a predetermined depth as the panel is conveyed past each of the crushing elements; and
e) a roller height adjuster secured to the support frame and operatively associated with the roller frame for varying the vertical and angular displacement of the roller frame with respect to the conveyor and the support frame and positioning the crushing elements at different heights with respect to the conveyor such that the crushing elements incrementally crush the portion of the panel.

32. The apparatus of claim 31 wherein the support frame includes first and second opposed leg assemblies and elongate cross support members extending transversely therebetween and unitary therewith, each of the leg assemblies including first and second spaced-apart legs, each of the legs including a slide bar secured thereto, the roller frame extending in the support frame between the leg assemblies and being supported in the slide bars to allow for the vertical and angular displacement of the roller frame with respect to the support frame.

33. The apparatus of claim 31 wherein the support frame includes first and second opposed leg assemblies and elongate cross support members extending transversely therebetween and unitary therewith, each of the leg assemblies including first and second spaced-apart legs, each of the legs including a slide bar secured thereto, the roller frame extending in the support frame between the opposed leg assemblies and being supported in the slide bars respectively to allow for the vertical and angular displacement of the roller frame with respect to the support frame, the apparatus including first and second roller height adjusters secured to the top of the support frame in spaced apart relationship and being operatively associated with the roller frame to allow the vertical and angular displacement of the roller frame.

34. The apparatus of claim 31 wherein the support frame includes first and second opposed leg assemblies and elongate cross support members extending transversely therebetween and unitary therewith, each of the leg assemblies including first and second spaced apart legs, each of the legs including a slide bar secured thereto, the roller frame including first and second trusses, the shafts extending transversely between the first and second trusses, the first truss extending between the first and second legs of the first leg assembly and including opposite ends secured in the slide bars on the first and second legs respectively of the first leg assembly, the second truss extending between the first and second legs of the second leg assembly and including opposite ends secured in the slide bars on the first and second legs respectively of the second leg assembly, the apparatus including first and second roller height adjusters secured to the top of the support frame in spaced apart relationship and operatively associated with the ends respectively of the first and second trusses of the roll frame to allow the vertical and angular displacement of the roller frame.

35. The apparatus of claim 31 further comprising a plurality of parallel compression roller shafts mounted to the roller frame, each of the compression roller shafts including an elongate keyway formed therein, the crushing elements comprising compression rollers mounted on the compression roller shafts respectively, the compression rollers including a key adapted to be fitted within the keyway for locking the compression rollers on the compression roller shafts respectively.

36. The apparatus of claim 31 wherein the crushing elements comprise compression rollers respectively mounted on a plurality of parallel compression roller shafts mounted to the roller frame, each of the compression roller shafts including an elongate keyway formed therein, each of the compression rollers including a generally elliptically shaped body and generally cylindrically shaped collars extending outwardly from the opposite ends of the body, and a key extending through one of the collars, the compression rollers being mounted on the respective compression roller shaft and the key on the respective compression roller extending into the keyway of the respective compression roller shaft for locking the respective compression roller on the respective compression roller shaft.

37. The apparatus of claim 31 wherein the crushing elements comprise compression rollers respectively mounted on a plurality of parallel compression roller shafts mounted to the roller frame, each of the compression rollers being generally elliptically shaped for forming said generally concavely shaped recess in the panel.

38. The apparatus of claim 31 wherein the crushing elements are at least as wide as the panel.

39. The apparatus of claim 31 wherein the crushing elements comprise compression rollers respectively mounted on a plurality of compression roller shafts mounted to the roller frame, the compression rollers being generally aligned to each other.

40. An apparatus for making a honeycomb panel including a recess comprising:
a) a support frame;
b) a conveyor including a plurality of conveyor rollers for conveying a honeycomb panel having a honeycomb core and a face sheet secured thereto;
c) a roller frame in the support frame mounted for vertical and angular displacement within the support frame;
d) a plurality of parallel and elongate compression roller shafts mounted to the roller frame spaced thereon in the direction in which the honeycomb panel is conveyed;
e) a plurality of aligned compression rollers mounted on the compression roller shafts respectively for compressively deforming a portion of the face sheet and the core of the honeycomb panel as the honeycomb panel is conveyed by the conveyor past the compression rollers and forming the recess therein, said compression rollers having a generally elliptically shaped body to form the recess with a generally concave shaped recess; and
f) first and second roller height adjusters secured to the top of the support frame and operatively associated with the roller frame for varying the vertical and angular displacement of the ends of the roller frame with respect to the conveyor and the support frame respectively and positioning the compression rollers at different heights with respect to the conveyor such that when the honeycomb panel is conveyed past the compression rollers, the compression rollers incrementally compress the honeycomb panel.

41. The apparatus of claim 40 further including first and second spaced-apart rows of compression rollers for forming first and second spaced-apart recesses in the honeycomb panel.

42. The apparatus of claim 40 wherein each of the compression roller shafts includes a keyway, each of the compression rollers including a key fitting in the keyway for locking the respective compression roller on the respective compression roller shaft.

43. The apparatus of claim 40 wherein each of the compression rollers includes a generally elliptically shaped body, a generally cylindrically shaped collar extending outwardly from each end of the body, and a central cylindrical bore extending through the collars and the body, the respective compression roller shaft extending through the bore and mounting the compression roller for longitudinal movement along the respective compression roller shaft, each of the compression rollers further including a key extending through one of the collars and each of the compression roller shafts including a keyway, the key extending into the keyway for locking the compression roller on the respective compression roller shaft.

44. The apparatus of claim 40 wherein each of the compression roller shafts has two spaced apart compression rollers mounted thereon for forming two spaced apart recesses in the panel, the apparatus further comprising a circular knife mounted to one of the compression roller shafts between the compression rollers thereon for cutting the panel into first and second panels each including a recess.

45. The apparatus of claim 40 wherein one of the compression roller shafts includes circular knifes mounted thereon adjacent the opposite ends of each of the compression rollers for cutting slits in the panel.

46. The apparatus of claim 40 wherein one of the compression rollers includes a knife edge around the outer surface thereof for simultaneously cutting a slit in the face sheet and compressing the panel.

47. An apparatus for making a honeycomb panel including a recess comprising:
a) a support frame;
b) a conveyor including a plurality of conveyor rollers for conveying a honeycomb panel having a honeycomb core and a face sheet secured thereto;
c) a roller frame in the support frame mounted for vertical and angular displacement within the support frame;
d) a plurality of parallel and elongate compression roller shafts mounted to the roller frame spaced thereon in the direction in which the honeycomb panel is conveyed;
e) a plurality of aligned cylindrical compression rollers mounted on the compression roller shafts respectively for compressively deforming a portion of the face sheet and the core of the honeycomb panel as the honeycomb panel is conveyed by the conveyor past the compression rollers and forming the recess therein, one of the compression roller shafts including circular knifes mounted thereon adjacent the opposite ends of each of the compression rollers for cutting slits in the panel; and
f) first and second roller height adjusters secured to the top of the support frame and operatively associated with the roller frame for varying the vertical and angular displacement of the ends of the roller frame with respect to the conveyor and the support frame respectively and positioning the compression rollers at different heights with respect to the conveyor such that when the honeycomb panel is conveyed past the compression rollers, the compression rollers incrementally compress the honeycomb panel.

48. An apparatus for making a honeycomb panel including a recess comprising:

a) a support frame;

b) a conveyor including a plurality of conveyor rollers for conveying a honeycomb panel having a honeycomb core and a face sheet secured thereto;

c) a roller frame in the support frame mounted for vertical and angular displacement within the support frame;

d) a plurality of parallel and elongate compression roller shafts mounted to the roller frame spaced thereon in the direction in which the honeycomb panel is conveyed;

e) a plurality of aligned compression rollers mounted on the compression roller shafts respectively for compressively deforming a portion of the face sheet and the core of the honeycomb panel as the honeycomb panel is conveyed by the conveyor past the compression rollers and forming the recess therein, one of the compression rollers includes a knife edge around the outer surface thereof for simultaneously cutting a slit in the face sheet and compressing the panel; and f) first and second roller height adjusters secured to the top of the support frame and operatively associated with the roller frame for varying the vertical and angular displacement of the ends of the roller frame with respect to the conveyor and the support frame respectively and positioning the compression rollers at different heights with respect to the conveyor such that when the honeycomb panel is conveyed past the compression rollers, the compression rollers incrementally compress the honeycomb panel.

* * * * *